March 30, 1965 J. C. KREJCI 3,175,888
APPARATUS FOR PRODUCING LOW STRUCTURE CARBON BLACK
Filed May 29, 1961
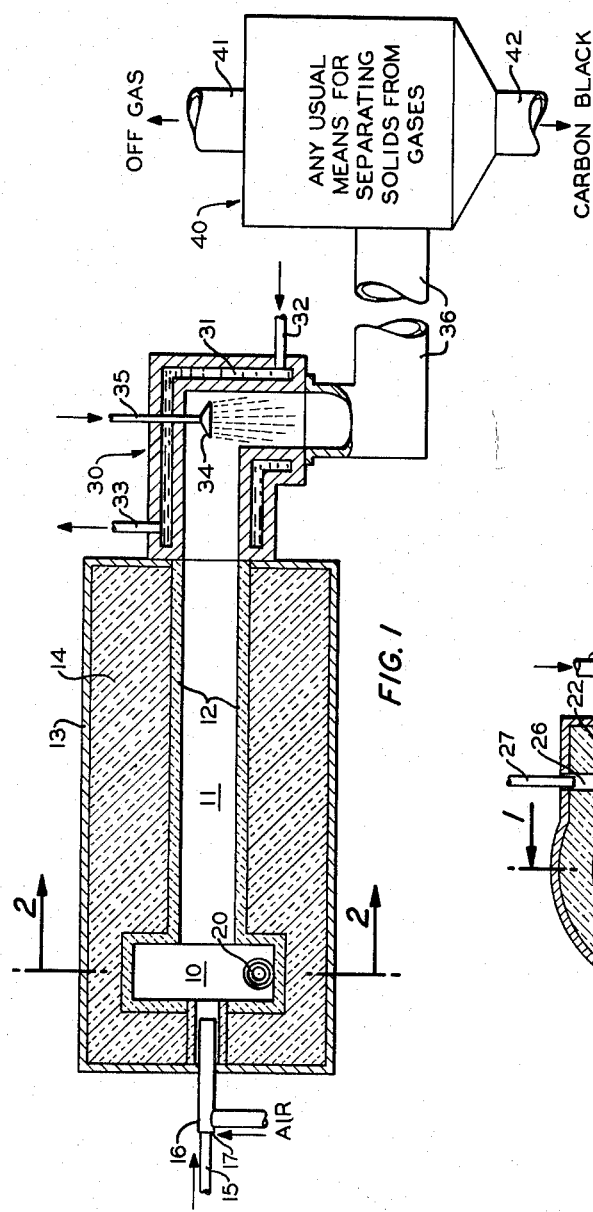
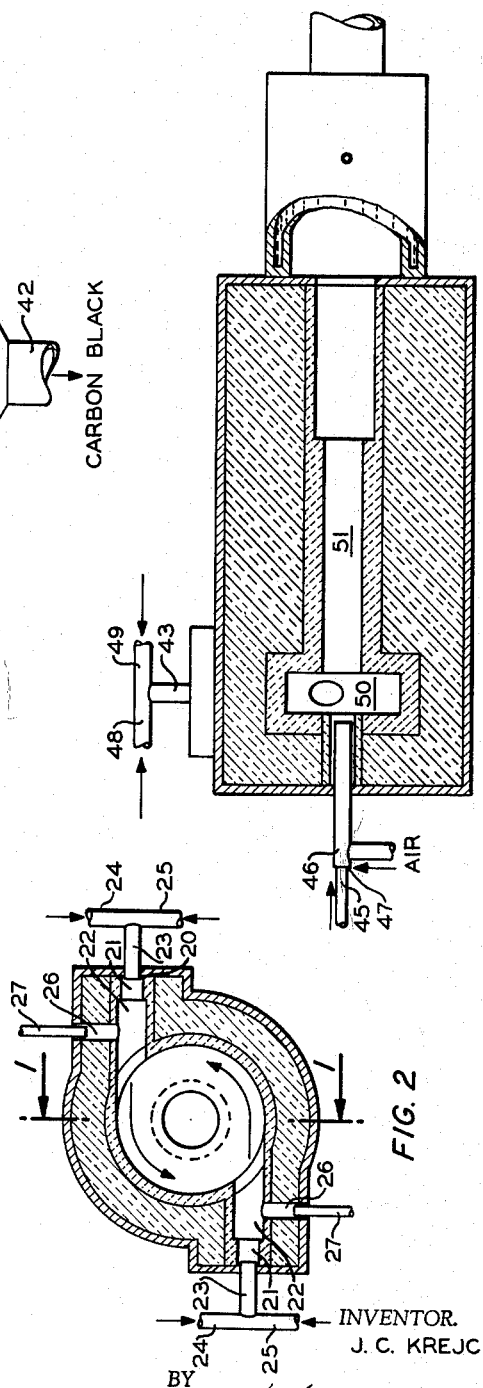
INVENTOR.
J. C. KREJCI
BY
ATTORNEYS

3,175,888
APPARATUS FOR PRODUCING LOW STRUCTURE CARBON BLACK
Joseph C. Krejci, Borger, Tex., assignor to Phillips Petroleum Company, a corporation of Delaware
Filed May 29, 1961, Ser. No. 123,336
1 Claim. (Cl. 23—259.5)

This invention relates to a process for making relatively low structure carbon black and to an apparatus for manufacturing such carbon black. In one aspect it relates to process for making relatively low structure carbon black by introducing a vaporous hydrocarbon axially into a zone wherein a helical flow of hot gases is maintained by introducing these gases tangentially and wherein these gases comprise combustion products containing appreciable amounts of excess fuel. In another aspect this invention relates to apparatus for the manufacturing of relatively low structure carbon black comprising means for injecting a vaporous hydrocarbon axially into a chamber and means for introducing hot gases tangentially into the chamber including a combustion chamber, conduit means for conducting the combustion products to the tangential inlet and means for introducing additional unburned fuel into the conduit means.

By "structure" of a carbon black is meant characteristics which relate to flocculation of the carbon black particles. The structure is said to be high when there is a strong tendency for the particles to form chains of particles. Conversely the structure is said to be low when there is little tendency to form such chains.

"High structure" carbon black is generally considered to be one having an oil absorption of about 1.35 to 1.45 and this is the usual range for furnace blacks. "Normal structure" is considered to be about 0.75 to 1.2 and has generally been made by the channel black process. "Low structure" is considered to be about 0.45 to 0.55 and is made by the thermal process. Recently, however, furnace blacks having relatively low structure for blacks of this type have been marketed. These blacks have, in some instances, proved to be useful in applications formerly served by channel blacks, for example, in reinforcing natural rubber products and in specific applications, for example, in non-squeal soft-riding tires. These blacks often are designated "low structure" blacks because they are lower than normal for blacks made by the furnace process even though their oil absorption values fall in the upper portion of the range of the blacks generally designated as "normal" structure or in the range between "normal" and "high" structure. Blacks made by my invention have a lower structure than is usual for furnace blacks using the same feed and having the same particle size and, therefore, are said to have relatively low structure. These blacks generally have an oil absorption in the range of about 0.9 to about 1.2 and are useful in reinforcing natural and synthetic rubbers, giving properties similar to that obtained when channel blacks are used. All of the above figures for oil absorption are for unpelleted black. Working tends to reduce this value and pelleted blacks have values approximately 0.1 lower in all ranges.

It is an object of my invention to produce relatively low structure carbon black in a furnace process.

Another object of my invention is to produce relatively low structure carbon black by feeding a hydrocarbon into a tangential rotating stream of hot gases in a carbon black furnace.

Another object of my invention is to provide apparatus for producing relatively low structure furnace carbon black.

Other aspects, objects and advantages of my invention are apparent in the written description, the drawing and the claim.

According to my invention there is provided a process for producing relatively low structure carbon black which comprises establishing a rotating mass of hot gases comprising combustion products containing at least about 20 percent of excess fuel in a generally cylindrical first zone having a diameter greater than its length and maintaining a temperature in the rotating mass above approximately 2400° to 2600° F. by continuously injecting additional hot gases, continuously passing a portion of the rotating gases into a generally cylindrical second zone having a length greater than its diameter and a diameter less than that of the first zone, in communication with and in axial alignment with the first zone, feeding a vaporous or atomized hydrocarbon along the axis of the first zone and passing it axially through the rotating mass of the first zone and axially into the center of the rotating mass in the second zone, forming carbon black from the vaporous hydrocarbon by pyrochemical action due to the heat of the surrounding hot gases and separating the carbon black from the resultant gaseous products of the process. The hot gases can be supplied by burning a normally gaseous fuel with up to about 80 percent of the stoichiometric amount of the free oxygen-containing gas. The fuel gas can be a residue natural gas and the free oxygen-containing gas can be air, in which case the stoichiometric ratio of air to gas is about 10 and the preferred ratio is between about 6 and about 8.

Also according to my invention the hot gases can be produced by burning a fuel with sufficient free-oxygen containing gas to produce a readily combustible mixture and injecting additional fuel into the resulting combustion products to produce a mixture containing at least about 20 percent of excess fuel. This procedure is particularly useful when the fuel is normally liquid and difficulty is found in maintaining combustion at the rich mixture desired.

Further according to my invention there is provided apparatus for producing relatively low structure carbon black which comprises a first generally cylindrical chamber having a diameter greater than its length, a second chamber having a length greater than its diameter and a diameter less than that of the first chamber, in communication with and in axial alignment with the first chamber, means for introducing hot gases tangentially into the first chamber comprising a combustion chamber, means for injecting a fuel and a free oxygen-containing gas into the combustion chamber, conduit means for conducting the hot gases from the combustion chamber to the first chamber and means in communication with the conducting means for injecting additional unburned fuel.

FIGURE 1 is a longitudinal sectional view of a furnace embodying my invention, taken on the line 1—1 of FIGURE 2.

FIGURE 2 is a transverse sectional view of the same furnace taken on the line 2—2 of FIGURE 1.

FIGURE 3 is a transverse sectional view of a modified furnace having an enlarged portion downstream of the second chamber.

The drawing is diagrammatic and such parts of the apparatus as feed lines, air carrying pipes, combustible gas pipes, pumps, valves, meters, pressure regulators, pressure measuring devices, temperature measuring devices, and other conventional apparatus are shown schematically or have been eliminated from the drawing to avoid unnecessary complication.

In the apparatus illustrated in FIGURES 1 and 2, a first short cylindrical chamber 10 having a rather large diameter is axially aligned with smaller diameter relatively long chamber 11 and chambers 10 and 11 have a lining 12 of highly refractory material such as sillimanite, alumina or other refractory suitable for the temperatures and materials encountered. Between the refractory liner 12 and the cylindrical steel shell 13 is a layer of insulation 14.

In the upstream or inlet end wall of chamber 10 is a feed pipe 15 arranged axially so that feed introduced therethrough passes axially through the furnace. Surrounding feed pipe 15 is a larger pipe 16 thus defining an annular space 17 through which air or other gas can pass into the furnace. The purpose of the gas passing through space 17 is to keep the inner end of feed tube 15 cooled to prevent the deposition of carbon thereon.

Around chamber 10 there are arranged inlets 20 which are disposed so that gas passing therethrough into chamber 10 does so in a direction tangent to the cylindrical wall. Each tangential inlet 20 comprises a combustion chamber 21 and a conduit 22 which latter terminates as an opening in the refractory liner 12 of chamber 10. A pipe 23 extends part way into combustion chamber 21 as shown. Separate conduits 24 and 25 are provided for feeding fuel and an oxygen containing gas, respectively to pipe 23. An inlet 26 is provided for additional fuel which can be supplied through pipe 27.

At the outlet end of the furnace is a cooler assembly 30 and a carbon black separating or recovery means 40. Cooler assembly 30 includes a water jacket 31 having inlet and outlet pipes 32 and 33, respectively, a spray nozzle 34 and a water supply pipe 35 therefore. A conduit 36 connects cooler assembly 30 with carbon black separating means 40. Off gas is taken from means 40 through pipe 41 while carbon black is removed through pipe 42.

In operation, a suitable fuel is fed through the pipes 25, mixes with a free-oxygen containing gas supplied through pipes 24 and a combustible mixture fed through the pipes 23 into combustion chambers 21 where combustion takes place. The hot products of combustion then flow through the conduits 22 and enter chamber 10 tangentially. Although 21 is designated as combustion chamber, in many instances a substantial amount of combustion also takes place in conduit 22 and some may occur in chamber 10, but the combustion is complete prior to mixing of the hot gases with the axial feed. The reactant enters through pipe 15 axially into chamber 10 and thence axially into chamber 11. Heat is transferred from the rotating hot gases to the axially fed reactant, thus converting or decomposing the reactant hydrocarbon to carbon black, the heat being transferred by mixing at the interface between the hydrocarbon and the combustion gases or by radiation, or both. Upon issuing from the reactor the gaseous effluent carrying the carbon black is cooled and the carbon black separated therefrom by any usual means such as running the effluent through bags to screen out the carbon black, through an electrical precipitator or cyclone separators, etc. When the hot gases entering chamber 10 contain between about 20 percent and about 40 percent of excess fuel and no substantial amount of air is added to the reaction zone, the resultant carbon black product has relatively low structure.

The furnace illustrated in FIGURE 3 is similar to that illustrated in FIGURE 1, corresponding parts being chambers 10 and 50, chambers 11 and 51, pipes 23 and 43, 15 and 45, 16 and 46, 24 and 48, 25 and 49, and annular spaces 17 and 47.

As pointed out above, by structure as herein applied, is meant the surface characteristics of the carbon black particles whereby these particles have a strong tendency to link together to form chains of particles. Where the tendency is strong to form particle chains, the black is said to have high structure, whereas when there is little tendency to form such chains the black is said to have low structure. Since it is not convenient to measure the structure directly, the oil absorption of the black, which has been found to correlate closely, often is used as a "measure" of the structure.

Oil absorption is measured by adding oil a few drops at a time to a one gram sample of carbon black on a mixing stone or glass plate. After each addition the oil is incorporated thoroughly with a spatula, using moderate pressure. Tiny pellets are formed, gradually increasing in size as more oil is added. The end point, approached one drop of oil at a time, is reached when a single ball of stiff paste is formed. The results are reported as cc. oil per gram of black or converted to gallons of oil per 100 pounds of black.

Although oil absorption correlates closely with structure, it is also affected by particle size. Particle size is a function of the total volumetric throughput which is determined to a large extent by the amount of tangential gas supplied. Further, in the production of carbon black, the temperature and the time of treatment are controlled to obtain a maximum of conversion with a minimum of aftertreating. Since the time of treatment is determined by consideration of particle size, the conversion is controlled by temperature. This is regulated by regulating the amount of reactant introduced, too large an amount resulting in lower than desired conversion while too small an amount results in aftertreatment. By my invention, relatively low structure carbon black is produced by using a lower than normal air fuel ratio at any desired throughput and temperature.

In this application, the incoming hot gas stream is characterized in two ways, (1) by percent theoretical air, the ratio of oxygen supplied to the theoretical (stichiometric) amount required for complete combustion of the tangential fuel, and (2) by percent excess fuel, the ratio of excess fuel to the actual fuel. The first is calculated as follows:

$$\frac{\text{Actual air (lbs./hr.)}}{\text{Theoretical air (lbs./hr.)}} \times 100$$

while the second is calculated as follows:

$$\frac{\text{Actual fuel (lbs./hr.)} - \text{theoretical fuel (lbs./hr.)}}{\text{Actual fuel}} \times 100$$

These values are related in the following manner:

Percent theoretical air + percent excess fuel = 100. Thus, by calculating as suggested, these values are easily compared. Where all of the fuel enters with the oxygen-containing gas, it is convenient to characterize the hot gases entering the reactor as produced by burning the fuel with a specified percentage of the stoichiometric free-oxygen containing gas. On the other hand, where additional fuel is added as well as where all the fuel enters with the oxygen-containing gas, it is convenient to characterize the gas as containing a specified percentage of excess fuel. I have found that a substantial reduction in structure of the produced black occurs when the percent of excess fuel is in the range of about 20 to about 40 percent, corresponding with about 80 to about 60 percent of theoretical air.

The amount of gas which enters through annular space 17 can be varied widely, but always is relatively small as compared with the tangential gas. This annular gas is not esesntial to the practice of my invention and can be dispensed with entirely. However, I prefer to utilize a small amount of gas to keep the inner end of feed pipe 15 cool to prevent carbon deposition thereon. The amount of gas supplied in this manner is not a large percentage of the total gases present in the reactor. If the gas is air it is not substantial as compared with the total air supplied to the tangential fuel and, in any case, is not enough to cause the percent of excess fuel present in the hot gases which contact the axial oil feed to be outside the specified range of about 20 to about 40 percent.

It is essential that the hot gases which contact the oil feed be maintained in the fuel rich condition. These gases comprise (1) the products of combustion of the tangential fuel and may comprise either or both of (2) added fuel and (3) added axial gas. The incoming tangential stream must be within the range of about 20 to about 40 percent excess fuel. Where the products of combustion are outside this range, additional fuel is added to bring the stream within this range. When a gas containing free oxygen is added in the axial annular entry, the incoming tangential stream is maintained sufficiently fuel rich that the combined gases are within the range of about 20 to about 40 percent excess fuel.

Suitable materials for use as the feed for conversion to carbon black include oils, such as kerosene, gasoline boiling range hydrocarbons, heavy or light naphthas or oils. Such hydrocarbon materials as natural gas, either dry gas, wet or raw natural gas as it comes from a gas well, or gasoline extraction plant or refinery residue gas may be used. Further, heavier, hydrocarbons than natural gases may be used as charge, such as butane, pentane, or the like. Thus, most hydrocarbons can be used as feed in my furnace. The feed may be injected as a liquid through a spray or atomizer, although I prefer to operate with the feed injected as a vapor. Hydrocarbons from other sources than petroleum likewise are suitable, as for example, low temperature coal gas, coal tar distillates, shale gases and distillates may be used. These charge stocks may contain almost any class of hydrocarbon compound, as for example, saturated or unsaturated hydrocarbons, paraffins, olefins, aromatics, naphthenes, or any others which might become available. An aromatic gas oil such as described is, however, a preferred feed stock.

As is well known, the carbon black yield is higher with high aromaticity (high BMCI). Therefore, although lower structure blacks can be obtained with lower aromaticity feeds, this is generally uneconomical because of the corresponding low yield. By the practice of my invention, a lower structure is obtainable with a given feed. Therefore, it is possible to obtain a lower structure for a given yield, or a higher yield for a given structure. Therefore, it does not relate to a specific value or range of values of structure since this is determined to some extent by the feed chosen. However, for the commonly used furnace black feedstocks which are, as noted above, aromatic gas oils and have a BMCI between about 90 and about 120, the structure obtained by the practice of my invention will generally be in the range of about 0.9 to about 1.2, measured by oil absorption.

Residue natural gas is a preferred tangenital fuel. A typical residue gas has the following analysis:

| | |
|---|---|
| Helium | 0.45 |
| Methane | 78.71 |
| Nitrogen | 9.01 |
| Propane | 3.45 |
| Ethane | 7.82 |
| i-Butane | 0.15 |
| $CO_2$ | 0.32 |
| n-Butane | 0.09 |
| Total | 100.00 |

However, other fuels may be used. For example, hydrocarbon oils as a spray or vapor, or gases other than natural gas (predominately methane) or mixtures of oil and gas or even powdered solid fuels may be used but fluids are preferred. Water gas, producer gas, coal gas, or even hydrogen can be used but are not preferred. One skilled in the art can readily determine or calculate the amount of air or other oxygen-containing gas necessary for the combustion of a particular fuel when the composition is known. Once the theoretical air-gas ratio is determined, the operating limits for the practice of my invention can be determined readily using the limits of about 60 to about 80 percent of this theoretical (stoichiometric) ratio.

The following examples illustrate the operation of my invention.

EXAMPLE I

An axial feed having the following properties was used:

*ASTM distillation*

[Corrected to 760 mm.]

| | |
|---|---|
| IBP | °F__ 423 |
| 5% | °F__ 472 |
| 10% | °F__ 481 |
| 20% | °F__ 492 |
| 30% | °F__ 503 |
| 40% | °F__ 514 |
| 50% | °F__ 524 |
| 60% | °F__ 540 |
| 70% | °F__ 560 |
| 80% | °F__ 595 |
| 90% | °F__ 654 |
| End point | °F__ 703 |
| Recovery | 97.5 |
| Pour point | −30 |
| Carbon residue, Conradson, wt. percent | 0.16 |
| Gravity, API | 20.8 |
| Aniline No. | 57.0 |
| BMCI | 72.3 |
| Flash, Pensky-Martins, °F. | 185 |
| Color, NPA | Dark |
| Molecular wt. (mean ave.) | 202 |
| Carbon content, wt. percent (est.) | 88.0 |

The oil feed described above was preheated to 700° F. prior to being introduced into pipe 45. Residue natural gas was used as the fuel gas feed through pipes 49 while air was fed through pipes 48 to mix therewith, the mixture entering pipe 43. The pipe 46 terminated adjacent the wall of chamber 10. Conditions and results of these runs are shown in Table I, Runs No. P–137, P–149, P–150 and P–152. In these runs, the reactor, as illustrated in FIGURE 3, chamber 50 had a diameter of 33 inches and a length of 12 inches while chamber 51 had a 69 inch length with a 12 inch diameter adjacent chamber 50 and a 63 inch length having a diameter of 21 inches in the downstream portion. Run number P–150, having a lower air/fuel ratio, had a lower structure.

TABLE I

| Run Number | Oil rate, gal./hr. | Preheat temp., °F. | Tangential air, m.c.f.h. | Tangential fuel gas, m.c.f.h. | Air to gas ratio | Axial gas, m.c.f.h. | Photelo-meter | Nitrogen surface area | CHCl₃ Color | Tinting strength, percent | Oil absorption |
|---|---|---|---|---|---|---|---|---|---|---|---|
| P-70 | 45 | 700 | 25 | 1.67 | 15 | Air-3 | | | Clear | 121 | 1.13 |
| P-72 | 85 | 700 | 50 | 3.33 | 15 | ...do | | | Almost clear. | 123 | 1.16 |
| P-74 | 170 | 700 | 125 | 8.33 | 15 | Air-4 | | | Clear | 144 | 1.24 |
| P-137 | 165 | 700 | 125 | 8.33 | 15 | ...do | | | ...do | 159 | 1.34 |
| P-149 | 185 | 700 | 125 | 8.33 | 15 | ...do | | | Almost clear. | | 1.12 |
| P-150 | 70 | 700 | 100 | 13.33 | 7.5 | 0 | | | Clear | | 0.98 |
| P-152 | 185 | 700 | 125 | 8.33 | 15 | 0 | | | ...do | | 1.27 |
| P-818 | 154.2 | 755 | 148 | 9.86 | 15 | Air-4 | 100 | 157.5 | | | 1.35 |
| P-830 | 250.3 | 755 | 148 | 9.86 | 15 | ...do | 92 | 75.2 | | | 1.35 |
| P-979R-1 | 94.0 | 775 | 140 | 18.67 | 7.5 | 0 | 87 | 83.4 | | | 1.17 |
| P-980 | 95.6 | 775 | 140 | 18.67 | 7.5 | Air-4 | 88 | 89.4 | | | 1.14 |
| P-981 | 49.4 | 775 | 140 | 18.67 | 7.5 | Fuel gas-3 | 87 | 99.5 | | | 1.12 |
| P-982 | 41.9 | 775 | 140 | 21.54 | 6.5 | 0 | 90 | 106.3 | | | 1.05 |
| P-984R-1 | 221.4 | 775 | 140 | 9.33 | 15 | Air-4 | 90 | 78.0 | | | 1.37 |
| P-985 | 170.3 | 775 | 140 | 9.33 | 15 | Fuel gas-4 | 89 | 80.3 | | | 1.30 |
| P-986 | 80.6 | 775 | 125 | 12.5 | 10 | Fuel gas-3 | 90 | 97.8 | | | 1.27 |

EXAMPLE II

Several runs were made with a feed oil comprising an SO₂ extract having the following characteristics:

*ASTM distillation*

[Corrected to 760 mm.]

| | | |
|---|---|---|
| FD | °F | 470 |
| 5% | °F | 558 |
| 10% | °F | 586 |
| 20% | °F | 611 |
| 30% | °F | 639 |
| 40% | °F | 660 |
| 50% | °F | 681 |
| 60% | °F | 711 |
| 70% | °F | 761 |
| 80% | °F | 820 |
| 82% | °F | 867 |
| Pour point | °F | 45 |
| Carbon residue, wt. percent | | 1.61 |
| Gravity, °API | | 11.0 |
| Refractive index, 20/D | | 1.5854 |
| BMCI | | 90.4 |
| Viscosity, SUS, @ 100° F. | | 81.9 |
| Viscosity, SUS, @ 210° F. | | 37.6 |
| Carbon, wt. percent | | 88.8 |
| Hydrogen, wt. percent | | 9.5 |
| Sulfur, wt. percent | | 1.29 |
| BS & W, vol. percent | | 0.17 |
| Pentane insoluble, wt. percent | | 0.44 |

These runs were made in a reactor as illustrated in FIGURE 1 in which the chamber 10 was 37 inches in diameter and 12 inches long, chamber 11 was 12 inches in diameter and 11 feet long, and there was a section 18 inches in diameter and 12 inches long downstream of chamber 11.

A mixture of residue natural gas and air was used as the tangential fuel. Conditions and results are illustrated in Runs No. P-979R-1, P-980, P-981, P-982, P-984R-1, P-985 and P-986 in Table I. Here again, the reduction in structure with reduction in air/fuel ratio is demonstrated.

EXAMPLE III

Runs were made at a normal air-fuel ratio with an oil feed having an aromaticity close to that of the oil used in Example I, illustrating that higher structure is obtained at these higher air-fuel ratios. The oil had the following characteristics:

*ASTM distillation*

[Corrected to 760 mm.]

| | | |
|---|---|---|
| IBP | °F | 428 |
| 5% | °F | 471 |
| 10% | °F | 482 |
| 20% | °F | 493 |
| 30% | °F | 502 |
| 40% | °F | 513 |
| 50% | °F | 524 |
| 60% | °F | 538 |
| 70% | °F | 552 |
| 80% | °F | 590 |
| 90% | °F | 643 |
| E.P. | °F | 686 |
| Percent recovery | percent | 98.0 |
| Pour point | °F | −25 |
| Carbon residue, Conradson | | 0.18 |
| Gravity | °API | 19.0 |
| Aniline No. | °F | 50.7 |
| BMCI | | 77.6 |
| Flash (P.M.) | °F | 200 |
| Color (N.P.A.) | | Dark |

These runs were made in a furnace and with the same tangential components as described in Example II. Conditions and results are given in Table I, Runs No. P-70, P-72 and P-74. These runs illustrate that, with a feed having an aromaticity in the same range as that of Example I, higher structure is obtained with an air/fuel ratio of 15.

Samples from Runs P-979R-1, P-980, P-981, P-982, P-984R-1, P-985 and P-986 were compounded with natural and synthetic rubber and vulcanized. The compounding recipe for synthetic rubber was:

| | Parts by weight |
|---|---|
| SBR 1000 | 100 |
| Carbon black | 40 |
| Zinc oxide | 3 |
| BRT #7 | 6 |
| Sulfur | 1.75 |
| Santocure | 0.8 |

SBR 1000 is that referred to in ASTM D1419-58T.

BRT. #7 is a rubber softener, a refined tar with a high free carbon content having a specific gravity of 1.20 to 1.25, available from Allied Chemical and Dye Corporation.

These compounds were vulcanized at 307° F. for several different times, 20, 30, 45 and 75 minutes. After vulcanization for 30 minutes the compound possessed properties as given in Table II, except for the 300 percent modulus average which was obtained from the average of all cures. After oven aging for 24 hours at 212° F. the compounds possessed the properties given in Table III.

The compounding recipe for natural rubber was:

| | Parts by weight |
|---|---|
| #1 Smoked Sheet | 100 |
| Carbon black | 40 |
| Stearic acid | 3 |
| Zinc oxide | 5 |
| Altax 5 | 0.6 |
| Sulfur | 2.5 |

Altax 5 is benzothiazyl disulfide $(C_6H_4NCS)_2S_2$.

These compounds were vulcanized at 293° for various times as shown in Table IV.

TABLE II

| Run Number | Compression Set, Percent | Cross-linking, $\nu \times 10^4$ mols./cc. | 80 F. | | | | ΔTF | Permanent Set, Percent | Resilience, Percent |
|---|---|---|---|---|---|---|---|---|---|
| | | | 300%-Modulus | | Tensile, p.s.i. | Elongation, Percent | | | |
| | | | Avg. All Cures,* p.s.i. | 30 Min., p.s.i. | | | | | |
| P-982 | 19.9 | 1.30 | 900 | 910 | 3,515 | 620 | 66.2 | 2.4 | 55.9 |
| P-979R-1 | 18.1 | 1.30 | 995 | 1,025 | 3,250 | 565 | 61.2 | 1.9 | 59.7 |
| P-980 | 16.9 | 1.30 | 1,010 | 1,035 | 3,450 | 575 | 62.5 | 1.9 | 58.9 |
| P-981 | 17.6 | 1.41 | 940 | 990 | 3,550 | 595 | 63.5 | 2.1 | 57.7 |
| P-986 | 17.8 | 1.43 | 1,055 | 1,085 | 3,455 | 580 | 63.5 | 2.0 | 56.9 |
| P-985 | 16.7 | 1.50 | 1,320 | 1,315 | 3,250 | 520 | 63.8 | 1.9 | 56.5 |
| P-984R-1 | 15.6 | 1.44 | 1,340 | 1,360 | 3,175 | 510 | 64.5 | 1.9 | 56.7 |
| Research Compounding Section Controls | | | | | | | | | |
| IRB #1 | 19.2 | 1.33 | 1,020 | 1,020 | 2,925 | 555 | 66.2 | 2.6 | 55.9 |
| PBI #3 | 20.4 | 1.34 | 1,105 | 1,160 | 3,250 | 555 | 67.2 | 2.9 | 55.9 |
| Regal 300 | 18.7 | 1.34 | 860 | 910 | 3,185 | 605 | 63.8 | 2.2 | 56.6 |

| Run Number | Shore Hardness | Abrasion | | Compounded, MS 1½ | Extrusion at 250 F. | | Tear Strength | |
|---|---|---|---|---|---|---|---|---|
| | | Loss, g. | Index | | in./min. | g./min. | 80 F., lb./in. | 200 F., lb./in. |
| P-982 | 59.5 | 9.45 | 116 | 37 | 35 | 102.5 | 325 | 275 |
| P-979R-1 | 57.5 | 10.14 | 109 | 32 | 32.5 | 102 | 320 | 175 |
| P-980 | 58.5 | 9.58 | 115 | 33 | 36.2 | 112 | 325 | 200 |
| P-981 | 59.0 | 9.48 | 116 | 35 | 36.2 | 111 | 310 | 230 |
| P-986 | 60.5 | 8.95 | 123 | 34 | 36.2 | 111.5 | 315 | 200 |
| P-985 | 61.0 | 8.59 | 129 | 33 | 35.8 | 107.5 | 245 | 205 |
| P-984R-1 | 61.5 | 8.80 | 126 | 33 | 36 | 108 | 260 | 170 |
| Research Compounding Section Controls | | | | | | | | |
| IRB #1 | 59.0 | 11.05 | 100 | 33 | 35.5 | 112.5 | 275 | 215 |
| PBI #3 | 60.5 | 8.50 | 130 | 39 | 36.5 | 111 | 375 | 220 |
| Regal 300 | 58.5 | 11.69 | 94 | 34 | 36.2 | 111 | 300 | 215 |

*20, 30, 45 and 75 minutes.

TABLE III

| Run Number | 80 F. | | | | | | | Abrasion | |
|---|---|---|---|---|---|---|---|---|---|
| | 300%-Modulus | | Tensile, p.s.i. | Elongation, percent | ΔTF | Permanent Set, percent | Resilience, percent | Loss, g. | Index |
| | Avg. All Cures,* p.s.i. | 30 Min., p.s.i. | | | | | | | |
| P-982 | 1,630 | 1,700 | 3,200 | 460 | 60.5 | 0.8 | 60.9 | 8.92 | 121 |
| P-979R-1 | 1,750 | 1,850 | 3,065 | 420 | 54.4 | 0.6 | 66.4 | 9.75 | 110 |
| P-980 | 1,790 | 1,865 | 3,170 | 430 | 55.1 | 0.7 | 65.3 | 9.15 | 118 |
| P-981 | 1,700 | 1,800 | 3,325 | 440 | 57.8 | 0.7 | 64.6 | 8.91 | 121 |
| P-986 | 1,840 | 2,010 | 3,170 | 410 | 57.5 | 0.7 | 64.1 | 8.50 | 126 |
| P-985 | 2,120 | 2,225 | 2,850 | 370 | 59.5 | 0.7 | 64.2 | 8.53 | 126 |
| P-984R-1 | 2,150 | 2,300 | 2,990 | 370 | 58.8 | 0.8 | 64.7 | 8.62 | 125 |
| IRB #1 | 1,725 | 1,825 | 2,650 | 400 | 57.1 | 0.8 | 65.2 | 10.76 | 100 |
| PBI #3 | 1,990 | 2,155 | 3,060 | 380 | 61.9 | 0.7 | 62.1 | 7.91 | 136 |
| Regal 300 | 1,540 | 1,660 | 2,810 | 420 | 55.8 | 0.9 | 64.3 | 11.13 | 97 |

* 20, 30, 45 and 75 minutes.

TABLE IV

| Black | P-982 | P-979R-1 | P-980 | P-981 | P-986 | P-985 | P-984R-1 | IRB #1 | PBI #3 | Regal 300 |
|---|---|---|---|---|---|---|---|---|---|---|
| Compounded ML-4 at 212 F | 67.8 | 68.0 | 70.0 | 70.0 | 72.0 | 72.0 | 72.6 | 67.8 | 74.0 | 65.0 |
| Physical Properties (Cured at 293 F.) | | | | | | | | | | |
| $\nu \times 10^4$, mols./cc.: | | | | | | | | | | |
| 10' | 1.07 | 1.19 | 1.13 | 1.13 | 1.10 | 1.21 | 1.18 | .94 | .95 | .97 |
| 20' | 1.62 | 1.71 | 1.66 | 1.64 | 1.65 | 1.82 | 1.83 | 1.54 | 1.45 | 1.47 |
| 30' | 1.80 | 1.92 | 1.89 | 1.89 | 1.86 | 1.95 | 1.96 | 1.77 | 1.82 | 1.76 |
| 40' | 1.89 | 2.00 | 1.92 | 1.95 | 2.00 | 2.16 | 2.18 | 1.95 | 1.89 | 1.84 |
| 300% Modulus, p.s.i.: | | | | | | | | | | |
| 10' | 1,090 | 1,360 | 1,140 | 1,130 | 1,140 | 1,470 | 1,500 | 1,050 | 1,025 | 850 |
| 20' | 1,510 | 1,675 | 1,630 | 1,625 | 1,675 | 2,060 | 2,050 | 1,470 | 1,380 | 1,170 |
| 30' | 1,690 | 1,880 | 1,860 | 1,770 | 1,860 | 2,050 | 2,120 | 1,780 | 1,800 | 1,470 |
| 40' | 1,800 | 1,925 | 1,910 | 1,790 | 1,970 | 2,350 | 2,290 | 1,780 | 1,930 | 1,530 |
| Avg | 1,525 | 1,710 | 1,635 | 1,580 | 1,660 | 1,985 | 1,990 | 1,520 | 1,535 | 1,255 |
| 400% Modulus, p.s.i.: | | | | | | | | | | |
| 10' | 1,800 | 2,210 | 1,920 | 1,890 | 1,890 | 2,370 | 2,390 | 1,740 | 1,710 | 1,470 |
| 20' | 2,400 | 2,660 | 2,570 | 2,610 | 2,640 | 3,120 | 3,030 | 2,380 | 2,330 | 1,990 |
| 30' | 2,640 | 2,925 | 2,830 | 2,820 | 2,920 | 3,080 | 3,200 | 2,780 | 2,890 | 2,375 |
| 40' | 2,800 | 3,020 | 2,975 | 2,860 | 3,075 | 3,415 | 3,390 | 2,825 | 2,970 | 2,430 |
| Avg | 2,410 | 2,705 | 2,575 | 2,545 | 2,630 | 2,995 | 3,005 | 2,430 | 2,475 | 2,065 |
| Tensile, p.s.i.: | | | | | | | | | | |
| 10' | 4,320 | 4,330 | 4,340 | 4,550 | 4,160 | 4,260 | 4,340 | 3,420 | 3,690 | 4,340 |
| 20' | 4,670 | 4,250 | 4,450 | 4,810 | 4,160 | 4,570 | 4,550 | 4,360 | 4,580 | 4,810 |
| 30' | 4,425 | 4,260 | 4,280 | 4,510 | 4,480 | 4,330 | 4,400 | 4,630 | 4,470 | 4,625 |
| 40' | 4,325 | 4,180 | 4,225 | 4,425 | 4,220 | 4,175 | 4,075 | 4,270 | 4,430 | 4,525 |
| Elongation, percent: | | | | | | | | | | |
| 10' | 660 | 610 | 635 | 650 | 630 | 575 | 580 | 575 | 620 | 690 |
| 20' | 610 | 550 | 575 | 580 | 570 | 520 | 525 | 575 | 610 | 645 |
| 30' | 565 | 515 | 525 | 535 | 525 | 510 | 500 | 555 | 535 | 590 |
| 40' | 535 | 490 | 510 | 530 | 500 | 455 | 455 | 515 | 520 | 575 |
| Tear Strength, lb./in. at 80 F.: | | | | | | | | | | |
| 20' | 785 | 625 | 685 | 705 | 750 | 675 | 645 | 820 | 805 | 785 |
| 30' | 750 | 690 | 605 | 665 | 660 | 600 | 520 | 745 | 685 | 695 |
| 40' | 775 | 660 | 600 | 640 | 675 | 585 | 580 | 645 | 795 | 730 |
| Tear Strength, lb./in. at 200 F.: | | | | | | | | | | |
| 20' | 420 | 455 | 395 | 515 | 510 | 465 | 385 | 395 | 415 | 440 |
| 30' | 400 | 365 | 445 | 345 | 395 | 415 | 340 | 390 | 455 | 375 |
| 40' | 425 | 355 | 380 | 365 | 365 | 325 | 325 | 355 | 385 | 340 |

The following tests were used to obtain the data of Tables II, III and IV:

Compression Set—ASTM D395–55 Method B, modified (0.325 inch spacers), compressed two hours at 212° F. plus relaxation for one hour at 212° F.

Cross-linking—determined from reciprocal volume swell and equilibrium modulus as described in Rubber World, 135, 67, 254 (1956).

Modulus, tensile and elongation, ASTM D412–51T.

ΔTF and Permanent Set, ASTM D623–58 Method A.

Resilience—Lupke Rebound, "Vanderbilt Rubber Handbook," p. 220 (1958).

Shore hardness—ASTM D676–58T.

Abrasion loss—modified Goodyear Huber Angle Abrader, 24 inch wheel, 1½ inches thick, Grade M, vitreous, grain size No. 36, Alundum of the Norton Company, Worcester, Massachussets.

Compounded Mooney—ASTM D927–57T, Mooney viscometer, small rotor, 1.5 minutes, 212° F. temperature.

Extrusions—No. ½ Royle extruder with Garvey die, as described in Ind. Eng. Chem., 34, 1309 (1942).

Tear strength—ASTM D624–54, razor-nicked crescent specimen.

EXAMPLE IV

Two runs were made with a fuel oil having the following characteristics:

*ASTM distillation*

[Corrected to 760 mm.]

| | | |
|---|---|---|
| IBP | ° F | 450 |
| 5% | ° F | 537 |
| 10% | ° F | 568 |
| 20% | ° F | 598 |
| 30% | ° F | 619 |
| 40% | ° F | 644 |
| 50% | ° F | 659 |
| 60% | ° F | 683 |
| 70% | ° F | 707 |
| 80% | ° F | 740 |
| 90% | ° F | 770 |
| Pour point | ° F | 35 |
| Carbon residue, Ramsbottom | wt. percent | 3.06 |

*ASTM distillation—Continued*

| | | |
|---|---|---|
| Gravity, ° API | | 10.5 |
| Aniline No. | ° F | 82.4 |
| BMCI | | 93.5 |
| Viscosity: | | |
| 100° F. | SUS | 84.24 |
| 210° F. | SUS | 36.12 |
| Carbon | wt. percent | 89.0 |
| Hydrogen | do | 9.6 |
| Sulfur | do | 1.37 |
| BS & W | vol. percent | 0.09 |
| Refractive Index, 20/D | | 1.5874 |

These runs were made in a reactor as illustrated in FIGURE 3 in which chamber 50 had a diameter of 37 inches and a length of 12 inches while chamber 51 had a diameter of 12 inches for a length of 132 inches followed by a diameter of 15 inches for a length of 46 inches. These runs, which are P-818 and P-830 in Table I, show that oil feed rate alone does not determine structure.

Throughout this application "BMCI" refers to "a correlation index developed by the Bureau of Mines and is used to denote aromaticity of an oil; a higher numerical index denotes a more armomatic oil. The index is calculated from the formula $$C.I. = \frac{48640}{K} + 473.7G - 456.8$$

where:

C.I.=Bureau of Mines correlation index
K=average boiling point (° K.) of the fraction
G=specific gravity @ 60° F./60° F. of the fraction Reasonable variation and modification are possible within the scope of my invention which sets forth method and apparatus for producing low structure carbon black by injecting the hydrocarbon reactant axially into a rotating mass of hot gases containing substantial quanities of an incompletely burned fuel.

I claim:

A furnace for producing low structure carbon black comprising a first generally cylindrical chamber having a diameter greater than its length, a second generally cylindrical chamber having a length greater than its diameter and a diameter less than that of said first chamber, said chamber being in communication with and in axial alignment with said first chamber, means for introducing a reactant hydrocarbon along the axis of said first chamber, a combustion chamber, means for introducing a fuel and a free oxygen-containing gas into said combustion chamber, means for conducting combustion products from said combustion chamber to said first chamber and introducing said products tangentially into said first chamber, and means for introducing additional quantities of said fuel directly into said means for conducting combustion products to said first chamber downstream of said means for introducing a fuel and a free oxygen-containing gas into said combustion chamber.

References Cited in the file of this patent

UNITED STATES PATENTS

| | | |
|---|---|---|
| 2,564,700 | Krejci | Aug. 21, 1951 |
| 2,782,101 | Heller | Feb. 19, 1957 |
| 2,852,345 | Rushford | Sept. 16, 1958 |
| 2,918,353 | Heller | Dec. 22, 1959 |
| 2,985,511 | Norris et al. | May 23, 1961 |

UNITED STATES PATENT OFFICE
CERTIFICATE OF CORRECTION

Patent No. 3,175,888                         March 30, 1965

Joseph C. Krejci

It is hereby certified that error appears in the above numbered patent requiring correction and that the said Letters Patent should read as corrected below.

Column 13, line 1, after "said", second occurrence, insert -- second --.

Signed and sealed this 17th day of August 1965.

(SEAL)
Attest:

ERNEST W. SWIDER                          EDWARD J. BRENNER
Attesting Officer                              Commissioner of Patents